United States Patent
Kogure et al.

(10) Patent No.: US 9,715,082 B2
(45) Date of Patent: Jul. 25, 2017

(54) LENS BARREL

(71) Applicant: RICOH IMAGING COMPANY, LTD., Tokyo (JP)

(72) Inventors: Yuji Kogure, Saitama (JP); Masahiko Kawamura, Saitama (JP)

(73) Assignee: RICOH IMAGING COMPANY, LTD., Tokyo (JP)

( * ) Notice: Subject to any disclaimer, the term of this patent is extended or adjusted under 35 U.S.C. 154(b) by 78 days.

(21) Appl. No.: 14/823,395

(22) Filed: Aug. 11, 2015

(65) Prior Publication Data

US 2016/0054540 A1    Feb. 25, 2016

(30) Foreign Application Priority Data

Aug. 21, 2014   (JP) ................................. 2014-168263

(51) Int. Cl.
| | |
|---|---|
| G02B 7/00 | (2006.01) |
| G02B 7/10 | (2006.01) |
| G02B 7/02 | (2006.01) |
| G02B 7/04 | (2006.01) |

(52) U.S. Cl.
CPC .............. *G02B 7/102* (2013.01); *G02B 7/00* (2013.01); *G02B 7/02* (2013.01); *G02B 7/026* (2013.01); *G02B 7/04* (2013.01); *G02B 7/10* (2013.01)

(58) Field of Classification Search
CPC . G02B 7/102; G02B 7/00; G02B 7/02; G02B 7/026; G02B 7/04; G02B 7/10
USPC ........ 359/824, 825, 823, 822, 819, 811, 642
See application file for complete search history.

(56) References Cited

U.S. PATENT DOCUMENTS

| | | | | |
|---|---|---|---|---|
| 4,962,583 | A | * | 10/1990 | Yang ....................... B23P 21/00 29/563 |
| 5,485,003 | A | * | 1/1996 | Kusada .................. G02B 7/346 250/201.8 |
| 9,103,967 | B2 | | 8/2015 | Iikawa et al. |
| 2008/0024889 | A1 | * | 1/2008 | Idemura ................. G02B 7/102 359/824 |
| 2012/0075731 | A1 | | 3/2012 | Iikawa et al. | |
| 2015/0138437 | A1 | * | 5/2015 | Matsuura ............... G02B 7/102 348/374 |

FOREIGN PATENT DOCUMENTS

| | | |
|---|---|---|
| JP | 11-337810 | 12/1999 |
| JP | 2000-258677 | 9/2000 |
| JP | 2012-072786 | 4/2012 |

* cited by examiner

*Primary Examiner* — William R Alexander
(74) *Attorney, Agent, or Firm* — Greenblum & Bernstein, P.L.C.

(57) ABSTRACT

A lens barrel includes a lens drive ring which moves a movable lens group along an optical axis, a first inputter including an actuator and generating a first rotational input, a second inputter which generates a second rotational input, a power transmission clutch including a first input member, a second input member and an output member, wherein the first input member is rotatable and is associated with the first inputter, the second input member is rotatable and is associated with the second inputter, and the output member is rotatable and is associated with the lens drive ring; and a load controller. When the second rotational input, which is generated by the second inputter, is applied to the second input member to thereby cause the first input member to rotate, the load controller exerts a rotational load on the actuator.

12 Claims, 7 Drawing Sheets

Fig. 6

Motor Driver Signals

| IN1 | IN2 | OUT1 | OUT2 | Operation |
|---|---|---|---|---|
| H | L | H | L | CW |
| L | H | L | H | CCW |
| H | H | L | L | Braking |
| L | L | z | z | Free |

Motor is turned OFF upon H(high-voltage)-signal being input to each of IN1 and IN2 from Microcomputer. At this time, if motor is rotated by an external force, motor acts as a dynamo, thus applying a brake to the rotation.

LENS BARREL

BACKGROUND OF THE INVENTION

Field of the Invention

The present invention relates to a lens barrel.

A lens barrel which incorporates a motor and a power transmission clutch is disclosed in Patent Literature 1. This lens barrel is provided with a lens drive ring, a manual operation ring, an electromagnetic motor and a power transmission clutch. Rotation of the lens drive ring causes a movable lens group to move forward and backward in the optical axis direction within a predetermined range, and the power transmission clutch is connected with the lens drive ring, the manual operation ring and the electromagnetic motor. Upon receiving an input (power) from one of the manual operation ring and the electromagnetic motor, the power transmission clutch causes the lens drive ring to rotate while preventing the other of the manual operation ring and the electromagnetic motor from rotating in the case where the holding torque of the manual operation ring (the torque required to rotate the manual operation ring that is at rest) and the rotational torque of the electromagnetic motor are each greater than the holding torque of the lens drive ring (the torque required to rotate the lens drive ring that is at rest) or the case where the holding torque of the electromagnetic motor and the rotational torque of the manual operation ring are each greater than the holding torque of the lens drive ring.

When the movable lens group is in an intermediate position (a position other than either terminus position) in the aforementioned predetermined range in the optical axis direction, the holding torque of the electromagnetic motor and the rotational torque of the manual operation ring are each greater than the holding torque of the lens drive ring. Therefore, in this state, manually rotating the manual operation ring causes the rotating force thereof to be transmitted to the power transmission clutch, and subsequently the power transmission clutch causes the lens drive ring to rotate (causes the movable lens group to move in the optical axis direction) without causing the electromagnetic motor to rotate).

Patent Literature 1: Japanese Unexamined Patent Publication No. 2012-72786

Patent Literature 2: Japanese Unexamined Patent Publication No. 2000-258677

In the case where the movable lens group is great in weight, the holding torque of the electromagnetic motor is smaller than the holding torque of the lens drive ring. Even in such a case, when the manual operation ring of the lens barrel disclosed in Patent Literature 1 is manually rotated, the power transmission clutch which receives a rotating force from the manual operation ring causes the electromagnetic motor to rotate (idly rotate) but does not cause the lens drive ring to rotate. Accordingly, the focusing operation of the lens barrel via the rotation of the manual operation ring is disabled.

In order to prevent the electromagnetic motor from rotating (idly rotating) (i.e., in order to move the movable lens group) in the case where the movable lens group is great in weight, it is advisable to, e.g., increase the torque (and hence, the size) of the electromagnetic motor so as to make the holding torque of the electromagnetic motor greater than the holding torque of the lens drive ring. However, an increase in size of the electromagnetic motor causes an increase in size of the lens barrel. In addition, the voltage supplied from the battery needs to be increased to drive the electromagnetic motor. To increase the voltage, it is required to increase the size of the battery and the converter (which are contained in the camera body), which causes an increase the size of the battery and converter and also the power supply circuit board on which the battery and the converter are mounted.

SUMMARY OF THE INVENTION

The present invention provides a lens barrel which can move a movable lens group without causing an actuator, as one of two mutually independent inputters, to rotate using an input from the other inputter and a power transmission clutch which can move the movable lens group using an input from the two mutually independent inputters even when the holding torque of the lens drive ring is large.

According to an aspect of the present invention, a lens barrel is provided, including a lens drive ring which moves, by rotating, a movable lens group along an optical axis; a first inputter which includes an actuator and generates a first rotational input; a second inputter which generates a second rotational input; a power transmission clutch which includes a first input member, a second input member and an output member, wherein the first input member is rotatable and is associated with the first inputter, wherein the second input member is rotatable and is associated with the second inputter, and wherein the output member is rotatable and is associated with the lens drive ring; and a load controller. When the second rotational input, which is generated by the second inputter, is applied to the second input member to thereby cause the first input member to rotate, the load controller exerts a rotational load on the actuator.

In one of the case where a holding torque of the first input member and a rotational torque of the second input member are each larger than a holding torque of the output member and one of the first input member and the second input member rotates by one of the first rotational input and the second rotational input, and the case where a holding torque of the second input member and a rotational torque of the first input member are each larger than the holding torque of the output member and one of the first input member and the second input member rotates by one of the first rotational input and the second rotational input, the power transmission clutch can cause the output member and the lens drive ring to rotate while preventing the other of the first input member and the second input member from rotating.

The load controller can include an electromagnetic load controller which exerts the rotational load on the actuator by electromagnetic control.

The load controller can be an electromagnetic load controller which exerts a rotational load caused by electromagnetic control on the actuator. The second inputter can include the manual operation member, wherein the actuator, from which the first inputter is configured, includes an electromagnetic motor. The electromagnetic load controller causes the electromagnetic motor to generate regenerative braking when the second rotational input which is generated by rotation of the manual operation member is applied to the second input member to thereby cause the first input member to rotate.

The first inputter can include a first electromagnetic motor which constitutes the actuator. The second inputter can include a second electromagnetic motor. When an input from one of the first electromagnetic motor and the second electromagnetic motor is applied to the power transmission clutch, it is desirable for the electromagnetic load controller to cause the other of the first electromagnetic motor and the second electromagnetic motor to generate regenerative braking.

The first inputter can include a first electromagnetic motor which constitutes the actuator. The second inputter can include a second electromagnetic motor which makes the holding torque of the second input member different in magnitude from the holding torque of the first input member. When one of the first input member and the second input member which is greater in the holding torque than the other of the first input member and the second input member rotates, the electromagnetic load controller causes one of the first electromagnetic motor and the second electromagnetic motor which is associated with the other of the first input member and the second input member, which is smaller in the holding torque than the one of the first input member and the second input member, to generate regenerative braking. When the other of the first input member and the second input member, which is smaller in the holding torque than the one of the first input member and the second input member, rotates, the electromagnetic load controller prohibits the other of the first electromagnetic motor and the second electromagnetic motor which is associated with the one of the first input member and the second input member, which is greater in the holding torque than the other of the first input member and the second input member, from generating regenerative braking.

According to another aspect of the present invention, a lens barrel is provided including a lens drive ring which moves, by rotating, a movable lens group along an optical axis within a predetermined range; an actuator which generates a first rotational input; a manual operation member which is manually rotated to generate a second rotational input; a power transmission clutch which includes a first input member, a second input member and an output member, wherein the first input member is rotatable and is associated with the actuator, wherein the second input member is rotatable and is associated with the manual rotation member, wherein the output member is rotatable and is associated with the lens drive ring, and wherein, when the movable lens group reaches a terminus position within the predetermined range by rotation of the manual operation member in one rotational direction, the power transmission clutch allows the manual operation member to further rotate in the one rotational direction; and a load controller. When the second input member rotates by the second rotational input from the manual operation member in a case where a holding torque of the first input member and a rotational torque of the second input member are each smaller than a holding torque of the output member, the power transmission clutch causes the first input member to rotate while preventing the output member and the lens drive ring from rotating. The load controller exerts a rotational load on the actuator when the actuator is in a non-driving state.

It is desirable for the load controller to include an electromagnetic load controller which intermittently exerts the rotational load on the actuator by electromagnetic control.

It is desirable for the actuator to include an electromagnetic motor, and for the rotational load to be caused by regenerative braking.

The present disclosure relates to subject matter contained in Japanese Patent Application No. 2014-168263 (filed on Aug. 21, 2014) which is expressly incorporated herein by reference in its entirety.

BRIEF DESCRIPTION OF THE DRAWINGS

The invention will be described below in detail with reference to the accompanying drawings, in which:

FIG. 6 is a table showing the relationship between input and output signals of a motor driver IC and operations of a focusing motor;

DESCRIPTION OF THE EMBODIMENTS

Figure 1:
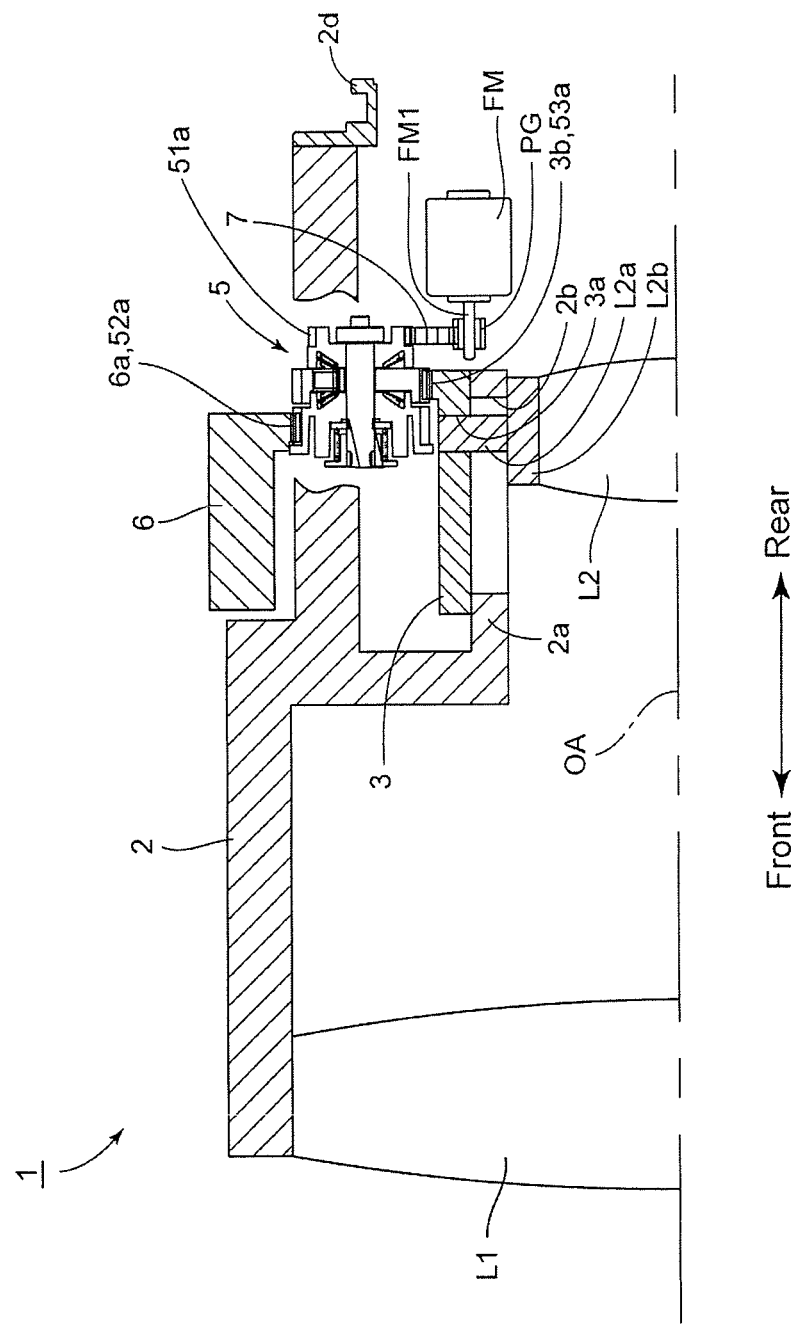
FIG. 1 is a longitudinal sectional view of an upper half of an embodiment of a lens barrel according to the present invention.

An embodiment of a lens barrel according to the present invention will be hereinafter discussed with reference to FIGS. 1 through 7. Directions described in the following description are defined based on the directions of arrows shown in the drawings. The lens barrel 1 is provided with a stationary barrel 2, a lens drive ring 3 and a manual operation ring (second inputter/manual operation member) 6. The stationary barrel 2 is an annular member with its center on an optical axis OA. The lens barrel 1 is provided with a photographing optical system including a first lens group L1 and a second lens group L2 positioned behind the first lens group L1. The first lens group L1 is fixedly fitted into the front end of the stationary barrel 2. The stationary barrel 2 is provided at the rear thereof with a support portion 2a which is positioned radially inside the outer periphery of the stationary barrel 2 and is shaped into a ring with its center on the optical axis OA. The stationary barrel 2 is further provided on the support portion 2a with linear guide grooves 2b (only one of which is shown in FIG. 1) which extend parallel to the optical axis OA. The stationary barrel 2 is provided at the rear end thereof with a lens mount 2d which is detachably attached to a mount (not shown in FIG. 1) provided on the camera body 10. The lens drive ring 3 is fitted on the outer periphery of the support portion 2a to be rotatable about the optical axis OA and immovable along the optical axis OA relative to the outer periphery of the support portion 2a. The lens drive ring 3 is provided with cam grooves 3a (only one of which is shown in FIG. 1) which are inclined with respect to the linear guide grooves 2b. The lens drive ring 3 is further provided at the rear end of the outer peripheral surface thereof with an outer gear 3b. The second lens group L2 that serves as a focusing lens group is positioned radially inside the support portion 2a and is supported by a lens support frame L2b. This lens support frame is provided with cam followers L2a (only one of which is shown in FIG. 1) which are formed to project radially outwards to be engaged in the linear guide grooves 2b and the cam grooves 3a so as to be movable relative thereto. The manual operation ring 6 is fitted on the outer periphery of the rear of the stationary barrel 2 and is rotatable about the optical axis OA while being immovable in the optical axis direction (i.e., the direction of the optical axis OA) relative to the stationary barrel 2. The manual operation ring 6 is provided on the rear end of the inner peripheral surface thereof with an inner gear 6a. The lens barrel 1 is provided, in the internal space of the stationary barrel 2 in the vicinity of the rear end of this internal space, with a focusing motor (actuator/first inputter/first electromagnetic motor/AF motor) FM configured from a DC motor (electromagnetic motor) which is installed in a fixed state. A rotary output pinion gear PG is fixedly fitted on an output shaft FM1 of the focusing motor FM.

The outer gear 3b of the lens drive ring 3, the inner gear 6a of the manual operation ring 6 and a power transmission clutch 5 are positioned inside the stationary barrel 2. The power transmission clutch 5 operates in association with the rotary output pinion gear PG that is fixed onto the output shaft FM1 of the focusing motor FM. The power transmission clutch 5 is provided with a rotational-center shaft 50, an output gear (output member) 53, a first input gear (first input member) 51 and a second input gear (second input member) 52 which are provided as major elements of the power transmission clutch 5. The rotational-center shaft 50 is irrotational, and the axis thereof extends in the optical axis direction. The output gear 53 is supported on the rotational-center shaft 50 to be rotatable coaxially with the rotational-center shaft 50. The first input gear 51 and the second input gear 52 are supported by the rotational-center shaft 50 to be rotatable coaxially with the rotational-center shaft 50 and are positioned immediately behind and in front of the output gear 53, respectively. The first input gear 51, the second input gear 52 and the output gear 53 are circular disc-shaped spur gears, and toothed portions 51a, 52a and 53a are formed on the circumferential surfaces of the first input gear 51, the second input gear 52 and the output gear 53, respectively. The toothed portion 53a of the output gear 53 is in mesh with the outer gear 3b of the lens drive ring 3, the toothed portion 51a of the first input gear 51 is in mesh with an idle gear 7 which is in mesh with the rotary output pinion gear PG of the focusing motor FM, and the second input gear 52 is in mesh with the inner gear 6a of the manual operation ring 6 (the idle gear 7 can be configured from a reduction gear).

Figure 2:
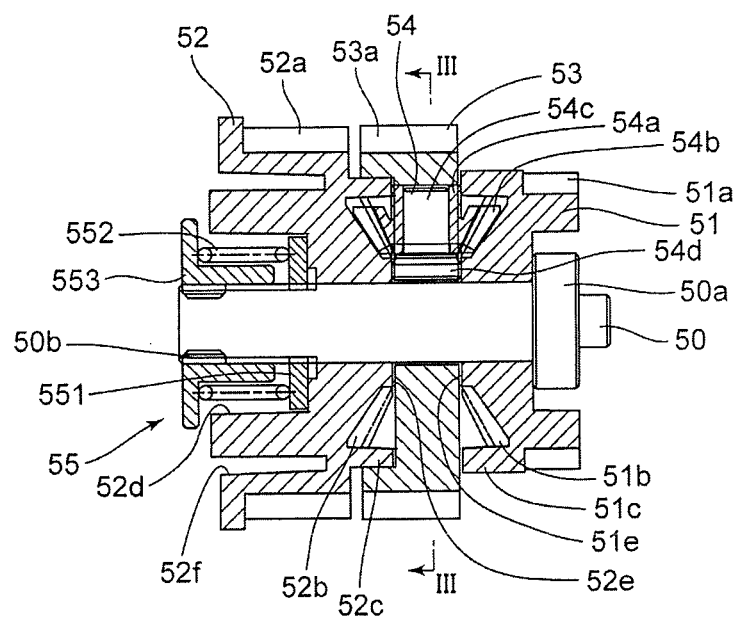
FIG. 2 is a longitudinal sectional view of a power transmission clutch provided in the lens barrel shown in FIG. 1.
Figure 3:
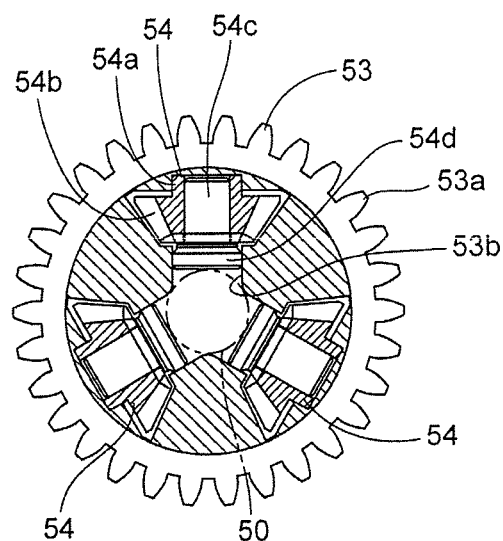
FIG. 3 is a sectional view taken along the line III-III shown in FIG. 2.
Figure 4:
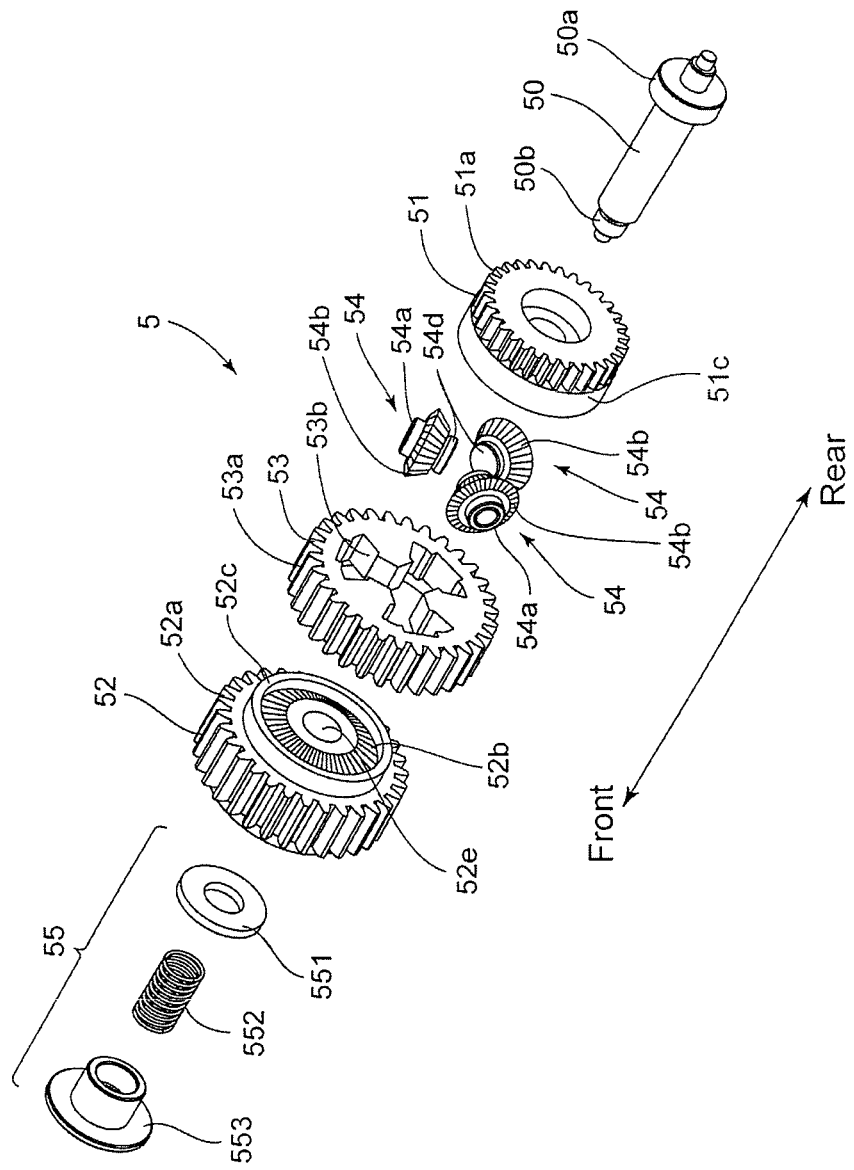
FIG. 4 is an exploded perspective view of the power transmission clutch.

The power transmission clutch 5 will be hereinafter discussed in detail with reference to FIG. 2, which shows an enlarged sectional view of the power transmission clutch 5 taken along the optical axis OA, FIG. 3, which shows an enlarged sectional view of the output gear 53 taken along a direction orthogonal to the optical axis OA, and FIG. 4 which shows an exploded perspective view of the power transmission clutch 5. A trefoil shaped (three-lobed leaf shaped) through-hole cavity 53b, each lobe shape thereof extending in radial directions from the shaft center of the rotational-center shaft 50, is formed in the output gear 53 at the center thereof. The through-hole cavity 53b incorporates three planetary bevel gears 54, each rotational shaft thereof extending in radial directions. Each of the three planetary bevel gears 54 is provided with a shaft portion 54a which constitutes one end (radially outer end with respect to the output gear 53) of the planetary bevel gear 54 and is further provided with a bevel gear portion 54b which is integrally formed with the shaft portion 54a. A reinforcing metal shaft 54c is coaxially fixedly fitted into the shaft portion 54a, and one end (radially inner end with respect to the output gear 53) of the metal shaft 54c constitutes a shaft portion 54d that is positioned on the opposite side (inner side) of the metal shaft 54c from the shaft portion 54a. In addition, the first and second input gears 51 and 52 are provided, on surfaces thereof which face the output gear 53, with sun bevel gears 51b and 52b, respectively, which are conically beveled, protrude toward each other and are engaged with the planetary bevel gears 54. The first and second input gears 51 and 52 are provided, on inner facing surfaces thereof which face the output gear 53, with sleeves (contacting sleeves) 51c and 52c which are formed integral with the first and second input gears 51 and 52, respectively, so as to protrude therefrom toward the output gear 53. The sleeves 51c and 52c are formed into annular rings and surround the circumferences of the sun bevel gears 51b and 52b, respectively. In addition, the sleeve 51c is formed so that the end face thereof is positioned at the same position as the top face 51e of the sun bevel gear 51b in the axial direction (the axial direction of the first input gear 51 and the second input gear 52) and the sleeve 52c is formed so that the end face thereof is positioned at the same position as the top face 52e of the sun bevel gear 52b in the axial direction (the axial direction of the first input gear 51 and the second input gear 52). In other words, the end face of the sleeve 51c and the top face 51e of the sun bevel gear 51b lie in a plane orthogonal to the axis of the rotational-center shaft 50 and the end face of the sleeve 52c and the top face 52e of the sun bevel gear 52b lie in a plane orthogonal to the axis of the rotational-center shaft 50. Additionally, by arranging the first input gear 51 and the second input gear 52 on both sides of the output gear 53, in the optical axis direction, with the three planetary bevel gears 54 installed in the through-hole cavity 53b of the output gear 53, the bevel gear portion 54b of each planetary bevel gear 54 engages with the sun bevel gears 51b and 52b of the first and second input gears 51 and 52. In addition, the shaft portion 54a of each planetary bevel gear 54, which is formed at one end thereof, is sandwiched and held, with respect to the optical axis direction (i.e., the direction of the optical axis OA), between the end faces of the sleeves 51c and 52c, which are positioned to face each other in the optical axis direction, while the shaft portion 54d of each planetary bevel gear 54, which is formed at the other end thereof, is sandwiched and held, with respect to the optical axis direction between the top faces 51e and 52e of the sun bevel gears 51b and 52b, which are positioned to face each other in the optical axis direction (see FIG. 2).

The rotational-center shaft 50 is inserted into the center hole of the first input gear 51 in a manner to allow the first input gear 51 to rotate on the rotational-center shaft 50, and the first input gear 51 is prevented from coming off the rotational-center shaft 50 by abutment of a rear surface of the first input gear 51 axially against a large-diameter stopper 50a provided at the rear end of the rotational-center shaft 50. In addition, the rotational-center shaft 50 is inserted into the center hole of the second input gear 52 in a manner to allow the second input gear 52 to rotate on the rotational-center shaft 50, a cavity 52d in the shape of a circle about the axis of the rotational-center shaft 50 is formed in the front of the second input gear 52, and a torque adjuster 55 for adjusting a holding torque and a rotational torque, which will be discussed later, is installed in the cavity 52d. The torque adjuster 55 is provided with a circular shaped washer (abutting member) 551 that is in contact with the inner base surface of the cavity 52d, a coil spring (resilient member) 552, one end thereof being in contact with (resiliently abutting against) the front-side surface of the washer 551, and an adjusting nut 553 having a female thread which is engaged with a male thread 50b formed at the front end of the rotational-center shaft 50. The adjusting nut 553 has an integrated flange, the rear side of which comes in contact with the other end of the coil spring 552 in the axial direction. In the torque adjuster 55, the deflection amount of the coil spring 552 is adjusted by adjusting the axial engagement position of the adjusting nut 553 with respect to the rotational-center shaft 50, whereby the resilient abutting force of the washer 551 against the inner base surface (outer side surface of the second input gear 52) of the cavity 52d is adjusted. Accordingly, due to the frictional force generated by the abutting force of the washer 551, the rotational resistance of the second input gear 52, i.e., the rotational torque, can be adjusted. The washer 551 is made of a material having a large friction coefficient, so that the frictional force becomes larger when the washer 551 abuts against the inner base surface of the cavity 52d of the second input gear 52. This abutting force exerts an influence on a portion where a rear surface of the first input gear 51 is in contact with the front surface of the stopper 50a; however, the friction coefficient of these two surfaces that are in contact with each other is small, thus being smaller than the torque adjustment amount of the second side gear 52 adjusted by the torque adjuster 55.

The second input gear 52 is further provided in the front surface thereof with a ring-shaped cushion groove 52f which is formed coaxially with the rotational-center shaft 50. The cushion groove 52f facilitates the radial elastic deformation of the outer periphery of the second input gear 52, i.e., the teeth 52a that is positioned on the radially outside of the cushion groove 52f. This elastic deformation serves for maintaining a favorable engagement state between the inner teeth 6a of the manual operation ring 6 and the teeth 52a, which will be discussed later.

Figure 5:
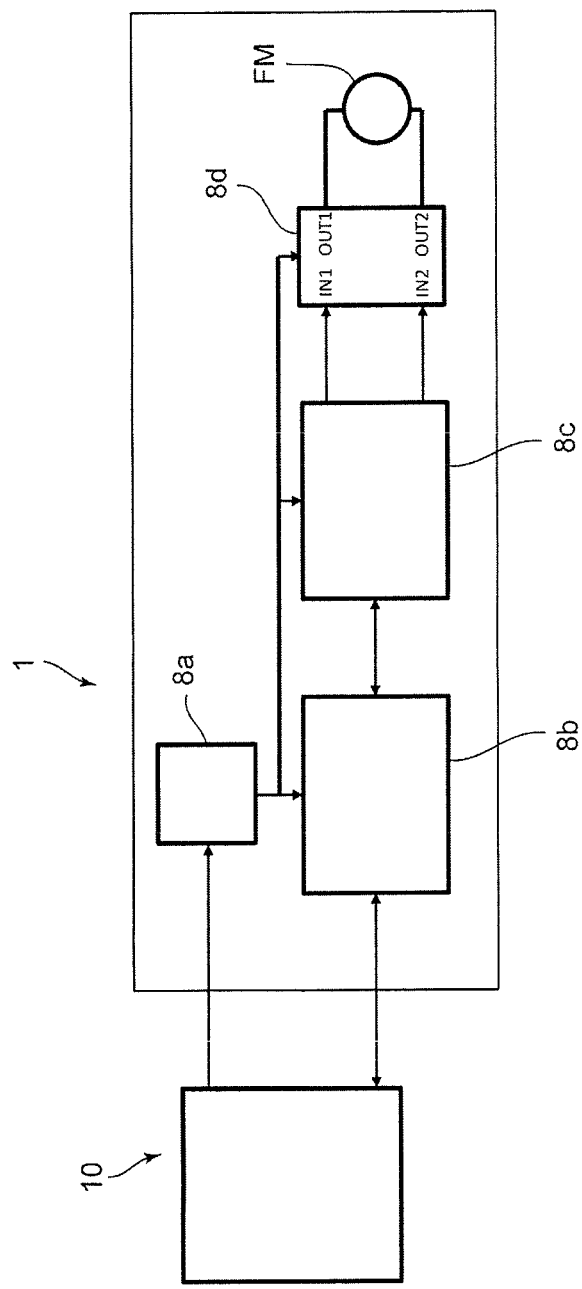
FIG. 5 is a schematic block diagram showing the lens barrel and a camera body to which the lens barrel is mounted.
Figure 7:
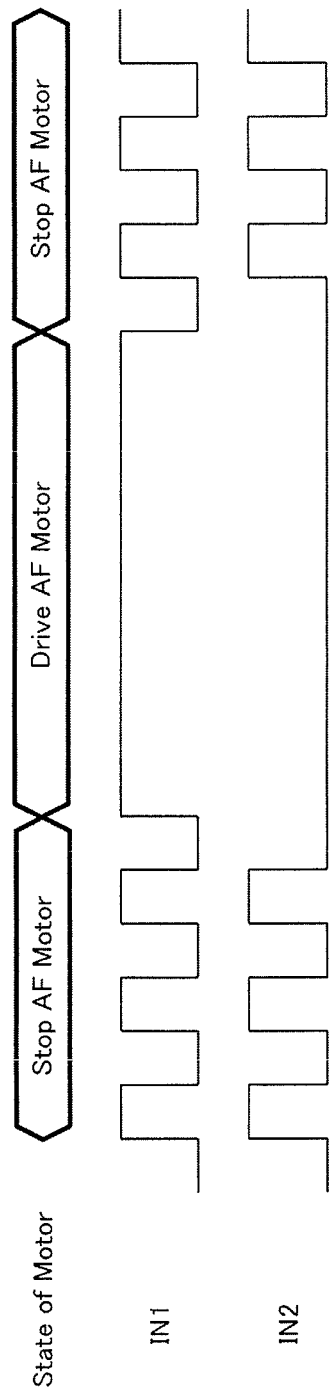
FIG. 7 is a timing chart showing operations of the focusing motor.

As shown in FIG. 5, the lens barrel 1 is provided therein with a power supply circuit 8a, a communication IC (electromagnetic load controller/load controller) 8b, a lens-controlling microcomputer (electromagnetic load controller/load controller) 8c and a motor driver 8d which are mutually connected. The motor driver IC8d is connected to the focusing motor FM. In addition, the camera body 10 is provided therein with a battery (not shown), a distance measurer (not shown) and an AF (autofocus) circuit (not shown). Upon a main switch (not shown) provided on the camera body 10 being turned ON with the lens barrel 1 attached to the camera body 10, the power of the battery is supplied to the power supply circuit 8a, which enables the AF circuit and the communication IC 8b to communicate with each other. Thereafter, as shown in FIG. 6, the focusing motor FM performs various operations upon receiving output signals from the motor driver IC 8d in accordance with types of input signals (signals of high voltage H and low voltage L) from the lens-controlling microcomputer 8c to the motor driver IC8d (IN1 and IN2). More specifically, the focusing motor FM rotates in the clockwise direction (CW direction) when the voltages of signals input to IN1 and IN2 of the motor driver IC 8d are "H" and "L", respectively, and the focusing motor FM rotates in the counterclockwise direction (CCW direction) when the voltages of signals input to IN1 and IN2 of the motor driver IC 8d are "L" and "H", respectively. Additionally, the focusing motor FM comes into a state capable of generating regenerative braking (short brake/load caused by electromagnetic control (electric control)) when the voltages of signals input to IN1 and IN2 of the motor driver IC 8d are "H" and "H", respectively (as will be discussed later, the regenerative braking occurs simultaneously with the commencement of rotation of the first input gear 51 caused by rotation of the second input gear 52, while the focusing motor FM is in a regenerative braking stand-by state when the first input gear 51 is at rest (not rotating); in addition, a rotation of the second input gear 52 causes regenerative braking when the output gear 53 does not rotate, whereas a rotation of the second input gear 52 causes no regenerative braking when the output gear 53 rotates), and the focusing motor FM comes into a free state (in which the focusing motor FM neither rotates nor generates a regenerative braking force) when the voltages of signals input to IN1 and IN2 of the motor driver IC 8d are "L" and "L", respectively. Additionally, when the focusing motor FM is not in operation, the focusing motor FM is made into a state capable of generating a regenerative braking force intermittently (at regular intervals) as shown in FIG. 7. On the other hand, when the focusing motor FM is in operation, the focusing motor FM cannot generate a regenerative braking force. During auto focusing (AF operation), the focusing motor FM is driven to rotate upon the lens barrel 1 receiving the result of a calculation (a signal) of the aforementioned AF circuit having received the result of a measurement by the aforementioned distance measurer. Since the rotating force of the focusing motor FM is transmitted to the first input gear 51 via the rotary output pinion gear PG and the idle gear 7, rotation of the focusing motor FM (inputting a first rotational input to the first input gear 51) causes the first input gear 51 to rotate. At this time, the manual operation ring 6 is not in operation and is stationary, and accordingly, the second input gear 52 that is in mesh with the inner teeth 6a of the manual operation ring 6 is stationary. Therefore, the rotation of the first input gear 51 causes the planetary bevel gears 54 to revolve around the rotational-center shaft 50 due to engagement between the sun bevel gear 51b of the first input gear 51 and the planetary bevel gears 54, thus causing the output gear 53, which is integral with the planetary bevel gears 54 in the circumferential direction about the rotational-center shaft 50, to rotate about the rotational-center shaft 50. Since rotation of the output gear 53 is transmitted to the outer gear 3b to thereby cause the lens drive ring 3 to rotate, the second lens group L2, which serves as a focusing lens group, is driven in the optical axis direction inside the stationary barrel 2 due to the engagement between the linear guide grooves 2b and the cam followers L2a and due to the engagement between the cam grooves 3a and the cam followers L2a , whereby autofocusing operation is performed.

During manual focusing (MF operation), rotating the manual operation ring 6 manually by a user (inputting a second rotational input to the second input gear 52) causes the second input gear 52, which is in engagement with the inner gear 6a of the manual operation ring 6, to rotate. At this time, because the focusing motor FM is not driven, the first input gear 51, which is engaged with the focusing motor FM, is stationary. Therefore, the rotation of the second input gear 52 causes the planetary bevel gears 54 to revolve around the rotational-center shaft 50 due to engagement between the sun bevel gear 52b of the second input gear 52 and the planetary bevel gears 54, thus causing the output gear 53, which supports the planetary bevel gears 54, to rotate with the planetary bevel gears 54 about the rotational-center shaft 50. Since rotation of the output gear 53 is transmitted to the outer gear 3b to thereby cause the lens drive ring 3 to rotate, the second lens group L2 is driven in the optical axis direction inside the stationary barrel 2 in a similar manner to the case where autofocusing operation is performed, whereby manual focusing operation is performed.

The holding torque and rotational torque of each gear, shown in FIG. 2 and others, are defined hereinbelow:

Holding torque Th1 (of the first input gear 51) (torque required to rotate the first input gear 51 at rest)=Original holding torque of the first input gear 51 itself+Holding torque of the idle gear 7+Holding torque when the output shaft FM1 of the focusing motor FM is rotated by an external force.

Holding torque Th2 (of the second input gear 52) (torque required to rotate the second input gear 52 at rest)=Original holding torque of the second input gear 52 itself+Holding torque of the manual operation ring 6.

Holding torque To (of the output gear 53)=Original holding torque of the output gear 53 itself+Holding torque of the lens drive ring 3 (including any holding torque converted from the movement force of the second lens group L2).

Rotational torque Tk1 (of the first input gear 51)=Rotational torque of the focusing motor FM−Th1.

Rotational torque Tk2 (of the second input gear 52)=Rotational torque of the manual operation ring 6 that is manually generated−Th2.

Furthermore, the holding torque To at the output gear 53 varies as indicated below:

To=∞: when the second lens group L2 (the lens frame 2) has reached a terminus position (front or rear movement limit) (when the cam followers L2a come in contact with common ends of the linear guide grooves 2b, or with stoppers respectively formed to correspond to the cam followers L2a in the case where these stoppers are provided in the vicinity of common ends of the linear guide grooves 2b).

To≠∞: when the second lens group L2 (the lens frame 2) has not reached the terminus position (when the cam followers L2a are in noncontact with common ends (or the aforementioned stoppers) of the linear guide grooves 2b; namely, when the lens barrel 1 is in a normal operation).

According to the above, in the operation of the power transmission clutch 5, to make the output gear 53 rotate while preventing the second input gear 52 from rotating when the first input gear 51 rotates and to make the output gear 53 rotate while preventing the first input gear 51 from rotating when the second input gear 52 rotates, the following relationship among the holding torque Th1 of the first input gear 51, the holding torque Th2 of the second input gear 52, and the holding torque To of the output gear 53 should be satisfied:

Th2>To, Th1>To.

The output gear 53 should rotate when the first input gear 51 or the second input gear 52 rotates, so that the holding torque Th2 of the second input gear 52 can be any of the following three conditions: Th2=Th1, Th2>Th1, and Th2<Th1.

When the gear mechanism 5 is applied to a lens barrel, for the purpose of carrying out the same operation as above, each of the aforementioned holding torques Th1, Th2 and To, and rotational torques Tk1 and Tk2 should satisfy the following conditions at either time the lens barrel 1 is driven by the focusing motor FM or manually.

(During Operation of the Focusing Motor FM)

In the case where To=∞, the condition Th2>Tk1 should be maintained.

After the second lens group L2 reaches the terminus position (i.e., after To becomes equal to ∞) by being driven in one direction, the second lens group L2 does not move even when the focusing motor FM is driven to further move the second lens group L2 in the aforementioned one direction; however, in this case, to prevent the manual operation ring 6 from rotating, the condition Th2>Tk1 should be maintained in the case where To=∞.

In the case where To≠∞, the conditions Th2>To and Tk1>To should be maintained.

In this case, the second lens group L2 will move as long as each of Th2 and Tk1 is larger than To; the question of which torque of Th1 and Tk2 is larger makes no difference. In this case, it is desirable that Th2 be set as large as positively possible to prohibit rotation of the manual operation ring 6 (to make Th2 larger than To).

(During Manual Drive)

In the case where To=∞ (in the case of Th1<To, and Tk1<To), the condition Th1>Tk2 or Th1<Tk2 should be maintained.

In this case, the focusing motor FM rotates with the rotation of the manual focus ring.

In the case where To≠∞, the conditions Th1>To and Tk2>To should be maintained.

In this case, the second lens group L2 will move by rotating the manual operation ring 6, as long as each of Th1 and Tk2 is larger than To; the question of which torque of Th1 and Tk2 is larger makes no difference.

As discussed above, the torque adjuster 55 carries out a torque adjustment on each of the gears 51, 52 and 53 via adjustment of engagement position of the adjusting nut 553. Specifically, in the torque adjuster 55, when the deflection amount of the coil spring 552 increases by the adjusting nut 553, the abutting force of the washer 551 against the side surface of the input gear 52 becomes larger, and this abutting force is transmitted to the output gear 53 via the sleeve 52c and the end surface 52e of the sun bevel gear 52b. This abutting force is further transmitted, from the output gear 53, to the sleeve 51c and the end surface 51e of the sun bevel gear 51b, i.e., to the first input gear 51. Hence, since the washer 551 may be made of any material having large friction coefficient, a large friction force can be obtained, thus the holding torque of the second input gear 52 can be set to the largest possible value.

In regard to the torque adjustment, the engagement state of the adjusting nut 553 should be adjusted in such a manner that, for example, during movement of the second lens group L2 by the rotating drive of the focusing motor FM, the manual operation ring 6 does not rotate. The second lens group L2 can also move by rotation of the manual operation ring 6 when the focusing motor FM is not driven; however, the adjusting nut 553 should be adjusted in such a manner that the rotation of the manual operation ring 6 can be carried out even after the second lens group L2 reaches the terminus position so that no more movement is allowed (i.e., after To becomes equal to ∞).

By setting the torque using the gears 51, 52 and 53 as discussed above, during auto focusing, when the focusing motor FM is driven to rotate the first input gear 51, the output gear 53 rotates, whereby the lens drive ring 3 and the second lens group L2 move in the optical axis direction while the second input gear 52 remains stationary. Thus, focusing can be carried out without rotating the manual operation ring 6 even when To is large (even when the second lens group L2 is great in weight or when the load on the cam followers L2a which is caused by the cam profiles of the cam grooves 3a is great). In this case, when the second lens group L2 moves to either the frontmost or rearmost position (terminus position) (i.e., when the cam followers L2a come into contact with common ends of the linear guide grooves 2b or the aforementioned stoppers), the rotation of both the lens drive barrel 3 and the output gear 53 is locked (prohibited), however, almost no mechanical damage to the focusing motor FM is caused. This is because, although not illustrated in the drawings, the lens barrel 1 is provided in the vicinity of one end of at least one linear guide groove 2b with a detector which detects that the cam followers L2a have reached points close to the one ends of the linear guide grooves 2b. Upon this detector detecting that the cam followers L2a have reached the aforementioned points, the operation of the focusing motor FM is controlled to bring the cam followers L2a into contact with the common ends of the linear guide grooves 2b or the aforementioned stoppers while braking the focusing motor FM (e.g., controlling the operation of the focusing motor FM so that it rotates in the reverse direction) with consideration given to as to how much farther the cam followers L2a should move to come into contact with the common ends of the linear guide grooves 2b or the aforementioned stoppers. The focusing motor FM may be any motor, including a motor other than DC motor.

On the other hand, during manual focusing, i.e., during focusing with the focusing motor FM not in operation, manually rotating the manual operation ring 6 causes the second input gear 52 to rotate, thus causing the output gear 53 that is in mesh with the second input gear 52 to rotate; with this rotation of the output gear 53, the lens drive ring 3 and the second lens group (focusing lens group) L2 can be driven in the optical axis direction. At this time (when the focusing motor FM is not in operation), the focusing motor FM becomes capable of generating regenerative braking. Namely, the holding torque Th1 of the first input gear 51 becomes larger than the holding torque To ($\neq \infty$) of the output gear 53 since the holding torque when the output shaft FM1 of the focusing motor FM is rotated by an external force becomes larger than that when the focusing motor FM is driven (when the focusing motor FM does not operates to generate regenerative braking). In other words, even when To is large (even when the second lens group L2 is great in weight or when the load on the cam followers L2a which is caused by the cam profiles of the cam grooves 3a is great), the condition Th1>To can reliably be achieved. Therefore, as long as the rotational torque of the manual operation ring 6 during rotation thereof is not larger than the holding torque Th1 of the first input gear 51, the first input gear 51 remains stationary even when To is large (even when the second lens group L2 is great in weight or when the load on the cam followers L2a which is caused by the cam profiles of the cam grooves 3a is great), and accordingly, the output gear FM1 of the focusing motor FM, which is engaged with the first input gear 51 via the idle gear 7, is not driven by an external force transmitted from the idle gear 7. In addition, upon the second lens group L2 moving to either the front terminus position or the rear terminus position (either the frontmost position or the rearmost position) (i.e., upon To becoming equal to $\infty$), the rotation of both the focusing cam barrel 3 and the output gear 53 is locked, which increases the rotational torque of the manual operation ring 6 (to greater than that in the case where To$\neq \infty$). However, even in such a state, increasing the operational force applied to the manual operation ring 6 causes the first input gear 51 to rotate upon the rotational torque (rotational operational force) of the manual operation ring 6 exceeding a predetermined torque (Th1), so that one can manually keep rotating the manual operation ring 6 while idling the focusing motor FM. The idle rotation does not incur damage to the focusing motor FM. With this structure, even when the user applies an excessive operational force on the manual operation ring 6, rotation of the manual operation ring 6 is allowed, which prevents mechanical damage to the manual operation ring 6.

Consequently, the focusing motor FM generates regenerative braking on an intermittent basis when the focusing motor FM (the output shaft FM1) idles. Therefore, the holding torque Th1 of the first input gear 51 when the focusing motor FM idles is larger than that before the occurrence of the regenerative braking. In addition, the minimum torque required for the manual operation ring 6 to rotate when To=$\infty$ (when the second lens group L2 has reached a terminus position) is Th2+Th1, and the minimum torque required for the manual operation ring 6 to rotate when To$\neq \infty$ (when the second lens group L2 has not reached the terminus position) is Th2+To. Namely, the rate of variation of Tk2 upon the second lens group L2 reaching a terminus position from a state not yet reaching the terminus position is represented by the following expression: (Th2+Th1)/(Th2+To). It is required to increase the holding torque Th2 of the second input gear 52 (to greater than To) to carry out autofocusing using the focusing motor FM when To is large (when the second lens group L2 is great in weight or when the load on the cam followers L2a which is caused by the cam profiles of the cam grooves 3a is great); however, if Th2 is increased, the denominator of the aforementioned expression increases. Therefore, provided that Th1 is small when Tk2 is large and To=$\infty$ (i.e., when the second lens group L2 has reached a terminus position), the aforementioned rate of variation is small, which makes it difficult for the user to perceive that the second lens group L2 has reached a terminus position. However, this rate of variation becomes large because the holding torque Th1 of the first input gear 51 has been made larger than that when autofocusing (AF) operation is performed by making the focusing motor FM generate a regenerative braking force. Hence, it is easy for the user to perceive that the second lens group L2 has reached a terminus position. Moreover, when not driven, the focusing motor FM is always in a state of being capable of generating a regenerative braking force (intermittently) by being controlled by the lens-controlling microcomputer 8c and the motor driver 8d. Accordingly, no additional detector which detects that the second lens group L2 has reached a terminus position needs to be provided since the focusing motor FM automatically generates regenerative braking to inform the user that the second lens group L2 has reached a terminus position upon the second lens group L2 reaching the terminus position (upon the output shaft FM1 of the focusing motor FM idling).

When the rotational torque is adjusted at the torque adjuster 55, the second input gear 52 is depressed in the axis direction against the output gear 53 as well as against the first input gear 51. Thus the shaft portions 54a and 54d of each of the planetary bevel gears 54 are respectively supportively sandwiched in between the first and second input gears 51 and 52, i.e., between the end surfaces 51e and 52e as well as between the sleeves 51c and 52c of the sun bevel gears 51b and 52b. Accordingly, the shaft portions 54a and 54d of each of the planetary gears 54 are supported in a closely contacting manner with the two input gears 51 and 52, which contributes to the minimizing of clearance in order to eliminate play around the shaft portions 54a and 54d. Therefore, with regard to the planetary gears 54, any potential eccentric rotation can be prevented, and a rotational output having high accuracy can be obtained by eliminating the play against the sun bevel gears 51b and 52b. In particular, with reference to the shaft portion 54d, the distance between the shaft centers of the input gears 51 and 52 can be adjusted by changing the thickness (diameter) of the shaft 54c, which further contributes to accurate production and cost reduction.

Figure 8:
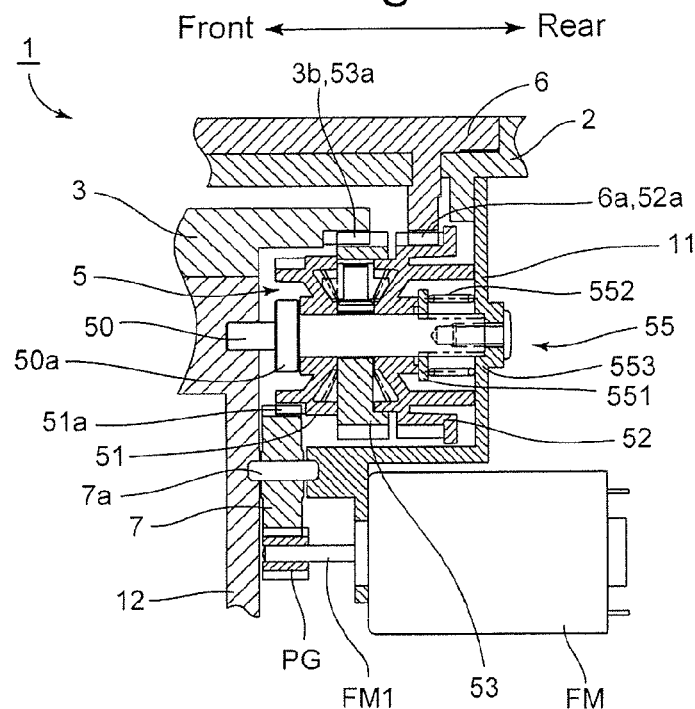
FIG. 8 is a longitudinal sectional view of the power transmission clutch and peripheral members in a first modified embodiment of the lens barrel.

Although the present invention has been described based on the above illustrated embodiments, the present invention is not limited solely thereto; various modifications to the above illustrated embodiment are possible. For instance, FIG. 8 shows a modified embodiment of the lens barrel 1, according to the present invention, in which the power transmission clutch 5 and members provided around the power transmission clutch 5 are different in structure. In the lens barrel 1 shown in FIG. 8 (the components of the lens barrel 1 shown in FIG. 8 which are similar to those of the previous embodiment of the lens barrel 1 are designated by the same reference numerals, though slightly different in shape, due to being identical in function to those of the previous embodiment of the lens barrel 1), the orientation of the power transmission clutch 5 of the lens barrel 1 shown in FIG. 8 in the forward and rearward directions is reversed to that in the previous embodiment of the lens barrel 1. The lens barrel 1 shown in FIG. 8 is provided with a first internal stationary member 11 and a second internal stationary member 12 which are fixed to the stationary barrel 2. A portion of the first internal stationary member 11 is used as the adjusting nut 553, and the idle gear 7 is rotatably supported on a rotational shaft 7a both ends of which are fixed to the first internal stationary member 11 and the second internal stationary member 12, respectively. Additionally, with the body of the focusing motor FM fixed to a part of the first stationary member 11, the rotary output pinion gear PG is engaged with the idle gear 7 and the inner teeth 6a of the manual operation ring 6 is engaged with the teeth 52a of the second input ring 52. In this modified embodiment of the lens barrel 1, the rotary output pinion gear PG, which is fixed to the output shaft FM1 of the focusing motor FM, is positioned further forward than the inner teeth 6a of the manual operation ring 6. Namely, the position of the manual operation ring 6 and the position of part of the focusing motor FM are coincident with each other with respect to the forward and rearward directions. Therefore, compared with the previous embodiment of the lens barrel 1, the lens barrel 1 shown in FIG. 8 can be shortened in length in the forward and rearward directions (by an amount corresponding to the sum of the amount by which the power transmission clutch 5 has been shifted forward relative to the manual operation ring 6 and the amount by which the focusing motor FM has been shifted forward relative to the power transmission clutch 5).

Figure 9:
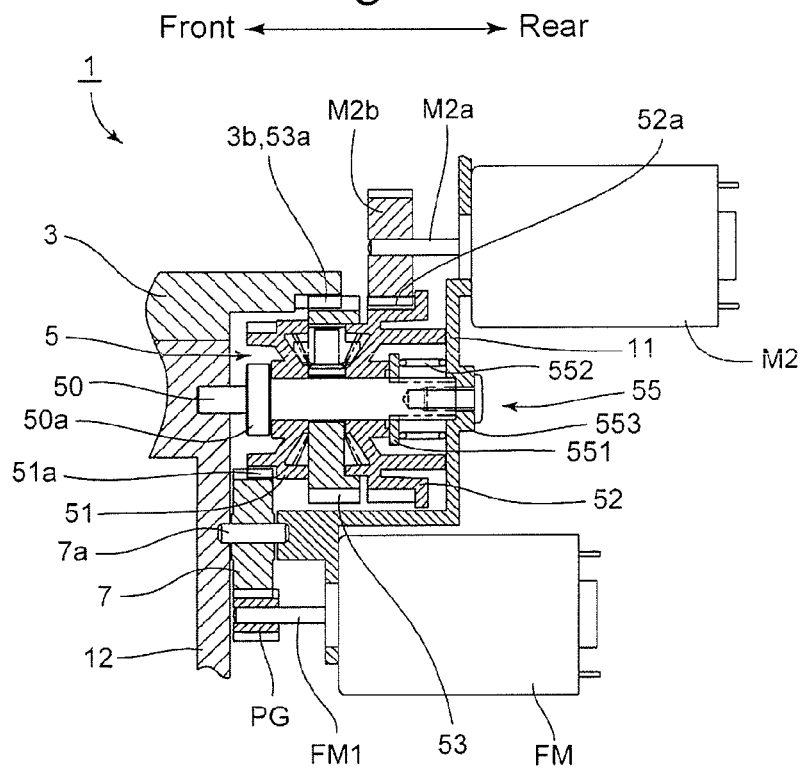
FIG. 9 is a longitudinal sectional view of the power transmission clutch and peripheral members in a second modified embodiment of the lens barrel.

FIG. 9 shows the power transmission clutch and peripheral members in a second modified embodiment of the lens barrel 1 according to the present invention. In the modified embodiment shown in FIG. 9, with the manual operation ring 6 omitted (or with the manual operation ring 6 configured to have no association with the power transmission clutch 5), the lens barrel 1 is provided with a second motor (second actuator/second inputter/second electromagnetic motor) M2 which is connected to the motor driver IC 8d, and a rotary output pinion gear M2b which is fixed to an output shaft M2a of the second motor M2 is engaged with the teeth 52a of the second input gear 52. The second motor M2 is an electromagnetic motor (however, the second motor M2 can be an DC motor or another type of motor). The holding torque Th2 (torque required to rotate the second input gear 52 at rest) and the rotational torque Tk2 of the second input gear 52 are as follows:

Holding torque Th2 (of the second input gear 52)=Original holding torque of the second input gear 52 itself+ Holding torque of the second motor M2.

Rotational torque Tk2 (of the second input gear 52)=Rotational torque of the second motor M2−Th2. In the modified embodiment shown in FIG. 9, in either of the motor holding torque and the rotational torque, the focusing motor FM is larger than the second motor M2. Therefore, the following conditional expressions are satisfied:

$$Th1 \geq Th2, \text{ and } Tk1 \geq Tk2.$$

In the modified embodiment shown in FIG. 9, one can selectively determine whether the focusing motor FM or the second motor M2 is used when shooting in AF mode. "Coarse-adjustment AF (speed-oriented AF)" can be performed when the focusing motor FM is selected, while "fine-adjustment AF (precision-oriented AF)" can be performed when the second motor M2 is selected. When an autofocusing operation is performed using one of the two motors (e.g., the focusing motor FM), the operation of the other motor (e.g., the second motor M2) is controlled to generate regenerative braking. Additionally, in the case where the moving distance of the second lens group L2 is great, it is possible to move the second lens group L2 first using the focusing motor FM (coarse-adjustment AF) and thereafter switch from the focusing motor FM to the second motor M2 to perform a fine focus adjustment (fine-adjustment AF) upon the second lens group L2 moving to a position close to an in-focus position. It is also possible to satisfy the following conditional expressions by making the second motor M2 greater than the focusing motor FM in each of the motor holding torque and the rotational torque:

$$Th1 \leq Th2, \text{ and } Tk1 \leq Tk2.$$

In addition, the operations of the focusing motor FM and the second motor M2 of the lens barrel 1 shown in FIG. 9 can be controlled in a different manner. For example, the operations of the focusing motor FM and the second motor M2 of the lens barrel 1 shown in FIG. 9 can be controlled in the following manner: when one of the two electromagnetic motors (e.g., the focusing motor FM) which is linked with a gear that is large in holding torque is driven, the other electromagnetic motor (e.g., the second motor M2) is made to generate regenerative braking on one hand; on the other hand, when one of the two electromagnetic motors (e.g., the second motor M2) which is linked with a gear that is small in holding torque is driven, the other electromagnetic motor (e.g., the focusing motor FM) is made not to generate regenerative braking.

In the above described modified embodiments, although the focusing motor FM is designated as the first inputter and the second motor is designated as the second inputter, the present invention is not limited thereto; the focusing motor FM can alternatively be designated as the second inputter and the second motor M2 can be designated as the first inputter.

In each of the above described embodiment and modified embodiments, each actuator (the focusing motor FM and the second motor M2) can be made to generate regenerative braking continuously instead of intermittently. In addition, the lens barrel 1 can be designed as a so-called power zoom (motor-driven) lens with the second lens group L2 serving as a lens group for perform a zooming operation. In this case, the structure of the lens barrel 1 can be applied to not only an interchangeable lens barrel but also to a lens barrel provided as part of a compact camera, a video camera (video camcorder), a television studio camera, or the like. Additionally, a movable lens group other than the second lens group L2 can be used as a lens group for use to perform a focusing operation and/or a zooming operation.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A lens barrel comprising:
a lens drive ring which moves, by rotation, a movable lens group along an optical axis;
a manual operation ring which is configured to transmit a rotational force to said lens drive ring;
a clutch including:
    a first input member which is connected to an actuator;
    a second input member which is connected to said manual operation ring; and
    an output member which is connected to said lens drive ring,
wherein said first input member, said second input member and said output member are arranged such that when said first input member is rotated by said actuator, said first input member transmits a rotational force to said output member, and when said second input member is manually rotated, said second input member transmits a rotational force to said output member; and
wherein, when said lens drive ring is not driven by said actuator, a rotational load is applied at least to said clutch.

2. The lens barrel according to claim 1, wherein, in one of:
a case where a holding torque of said first input member and a rotational torque of said second input member are each larger than a holding torque of said output member and one of said first input member and said second input member rotates by one of said lens drive ring and said manual operation ring, and
a case where a holding torque of said second input member and a rotational torque of said first input member are each larger than said holding torque of said output member and one of said first input member and said second input member rotates by one of said lens drive ring and said manual operation ring,
said clutch causes said output member and said lens drive ring to rotate while preventing the other of said first input member and said second input member from rotating.

3. The lens barrel according to claim 1, further comprising an electromagnetic load controller which exerts said rotational force on said actuator by electromagnetic control.

4. The lens barrel according to claim 3,
wherein said actuator comprises an electromagnetic motor, and
wherein said electromagnetic load controller causes said electromagnetic motor to generate regenerative braking when said rotational force, which is generated by said manual operation member, is applied to said second input member to thereby cause said first input member to rotate.

5. The lens barrel according to claim 3, wherein said actuator comprises a first electromagnetic motor
said second input member comprises a second electromagnetic motor, and
wherein, when an input from one of said first electromagnetic motor and said second electromagnetic motor is applied to said clutch, said electromagnetic load controller causes the other of said first electromagnetic motor and said second electromagnetic motor to generate regenerative braking.

6. The lens barrel according to claim 1, wherein said first input member comprises a first electromagnetic motor which constitutes said actuator,
wherein said second input member comprises a second electromagnetic motor which makes a holding torque of said second input member have a different magnitude from a holding torque of said first input member,
wherein, when one of said first input member and said second input member, which has a greater holding torque than the other of said first input member and said second input member rotates, an electromagnetic load controller causes one of said first electromagnetic motor and said second electromagnetic motor, which is associated with said other of said first input member and said second input member, which has a smaller holding torque than said one of said first input member and said second input member, to generate regenerative braking, and
wherein, when said other of said first input member and said second input member, which has a smaller holding torque than said one of said first input member and said second input member, rotates, said electromagnetic load controller prohibits the other of said first electromagnetic motor and said second electromagnetic motor which is associated with said one of said first input member and said second input member, which has a greater holding torque than said other of said first input member and said second input member, from generating regenerative braking.

7. A lens barrel comprising:
a lens drive ring which moves, by rotation, a movable lens group along an optical axis within a predetermined range;
an actuator which comprises an electromagnetic motor that generates a first rotational input;
a manual operation member which is manually rotated to generate a second rotational input;
a power transmission clutch which includes a first input member, a second input member and an output member, wherein said first input member is rotatable and is associated with said actuator, said second input member is rotatable and is associated with said manual rotation member, said output member is rotatable and is associated with said lens drive ring, and, when said movable lens group reaches a terminus position within said predetermined range by rotation of said manual operation member in one rotational direction, said power transmission clutch allows said manual operation member to further rotate in said one rotational direction; and
a load controller that comprises an electromagnetic load controller which intermittently exerts a rotational load on said actuator by electromagnetic control,
wherein, when said second input member rotates by said second rotational input from said manual operation member when a holding torque of said first input member and a rotational torque of said second input member are each smaller than a holding torque of said output member, said power transmission clutch causes said first input member to rotate while preventing said output member and said lens drive ring from rotating, and
wherein said load controller exerts said rotational load on said actuator when said actuator is in a non-driving state, said rotational load being generated by regenerative braking.

8. The lens barrel according to claim 1, wherein each of said first input member, said second input member, and said output member comprises a circular disc shaped spur gear.

9. A lens barrel comprising:
- a lens drive ring which moves, by rotating, a movable lens group along an optical axis;
- a first inputter which includes an actuator and generates a first rotational input;
- a second inputter which generates a second rotational input;
- a power transmission clutch which includes a first input member, a second input member and an output member, wherein said first input member is rotatable and is associated with said first inputter, said second input member is rotatable and is associated with said second inputter, and said output member is rotatable and is associated with said lens drive ring; and
- a load controller,
- wherein, when said second rotational input, which is generated by said second inputter, is applied to said second input member to thereby cause said first input member to rotate, said load controller exerts a rotational load on said actuator,
- wherein said second inputter comprises said manual operation member,
- wherein said actuator, from which said first inputter is configured, comprises an electromagnetic motor, and
- wherein said load controller causes said electromagnetic motor to generate regenerative braking when said second rotational input, which is generated by rotation of said manual operation member, is applied to said second input member to thereby cause said first input member to rotate.

10. The lens barrel according to claim 9, wherein, in one of:
- a case where a holding torque of said first input member and a rotational torque of said second input member are each larger than a holding torque of said output member and one of said first input member and said second input member rotates by one of said first rotational input and said second rotational input, and
- a case where a holding torque of said second input member and a rotational torque of said first input member are each larger than said holding torque of said output member and one of said first input member and said second input member rotates by one of said first rotational input and said second rotational input, said power transmission clutch causes said output member and said lens drive ring to rotate while preventing the other of said first input member and said second input member from rotating.

11. The lens barrel according to claim 9, wherein said electromagnetic motor comprises a first electromagnetic motor,
- wherein said second inputter comprises a second electromagnetic motor, and
- wherein, when an input from one of said first electromagnetic motor and said second electromagnetic motor is applied to said power transmission clutch, said electromagnetic load controller causes the other of said first electromagnetic motor and said second electromagnetic motor to generate regenerative braking.

12. The lens barrel according to claim 9, wherein said electromagnetic motor comprises a first electromagnetic motor,
- wherein said second inputter comprises a second electromagnetic motor which makes a holding torque of said second input member have a different magnitude from a holding torque of said first input member,
- wherein, when one of said first input member and said second input member which has a greater holding torque than the other of said first input member and said second input member rotates, said electromagnetic load controller causes one of said first electromagnetic motor and said second electromagnetic motor which is associated with said other of said first input member and said second input member, which has a smaller holding torque than said one of said first input member and said second input member, to generate regenerative braking, and
- wherein, when said other of said first input member and said second input member, which has the smaller holding torque than said one of said first input member and said second input member, rotates, said electromagnetic load controller prohibits the other of said first electromagnetic motor and said second electromagnetic motor which is associated with said one of said first input member and said second input member, which has the greater holding torque than said other of said first input member and said second input member, from generating regenerative braking.

* * * * *